(12) United States Patent
Lu et al.

(10) Patent No.: US 10,152,068 B1
(45) Date of Patent: Dec. 11, 2018

(54) ELECTRICAL BALLAST AND DRIVING METHOD THEREOF

(71) Applicant: DELTA ELECTRONICS, INC., Taoyuan (TW)

(72) Inventors: Yung-Chuan Lu, Taoyuan (TW); Ching-Ho Chou, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/896,082

(22) Filed: Feb. 14, 2018

(51) Int. Cl.
*H05B 37/02* (2006.01)
*H05B 39/02* (2006.01)
*G05F 1/12* (2006.01)
*H05B 41/16* (2006.01)
*H05B 41/36* (2006.01)
*H05B 39/04* (2006.01)
*H05B 41/24* (2006.01)
*H05B 41/14* (2006.01)

(52) U.S. Cl.
CPC .............. *G05F 1/12* (2013.01); *H05B 37/02* (2013.01); *H05B 39/04* (2013.01); *H05B 41/14* (2013.01); *H05B 41/16* (2013.01); *H05B 41/24* (2013.01); *H05B 41/36* (2013.01)

(58) Field of Classification Search
CPC ............ H05B 41/2855; H05B 41/2828; H05B 41/2851; H05B 41/2856; H05B 41/2981; H05B 41/2985; H05B 41/2853; H05B 41/2925; H05B 41/2926; H05B 41/2986; H05B 41/36; H05B 41/16; H05B 39/04; Y02B 20/208; Y02B 70/1441; G05F 1/12
See application file for complete search history.

(56) References Cited

U.S. PATENT DOCUMENTS

| | | | |
|---|---|---|---|
| 8,159,142 B2 | 4/2012 | Chou et al. | |
| 8,410,713 B2 * | 4/2013 | Kumar ............... | H05B 41/2855 315/200 R |
| 8,564,216 B1 * | 10/2013 | Gallegos ............ | H05B 41/2985 315/226 |
| 8,569,966 B2 * | 10/2013 | Kumar ................ | H05B 41/042 315/200 R |
| 8,577,208 B2 * | 11/2013 | Ikeuchi ................ | H04N 19/597 386/343 |
| 9,301,375 B2 * | 3/2016 | Kumar .................. | H05B 41/16 |

FOREIGN PATENT DOCUMENTS

TW I245589 B 12/2005

* cited by examiner

*Primary Examiner* — Vibol Tan
(74) *Attorney, Agent, or Firm* — CKC & Partners Co., Ltd.

(57) ABSTRACT

An electrical ballast includes an inverter circuit and a detection circuit. The inverter circuit is configured to receive a dc voltage and provide an output voltage to a lighting module. The detection circuit is electrically coupled to the inverter circuit and a voltage source, and configured to detect an ac voltage signal in the inverter circuit, and pull down the voltage source from a supply level to an under voltage locking level to shut down the inverter circuit on the condition that the ac voltage signal is greater than a threshold value, and restart the inverter circuit after a delay period.

20 Claims, 7 Drawing Sheets

ELECTRICAL BALLAST AND DRIVING METHOD THEREOF

BACKGROUND

Technical Field

The present disclosure relates to an electrical ballast, and in particular, to the electrical ballast with ability to perform auto-restrike.

Description of Related Art

Fluorescent lamp tubes and light-emitting diode (LED) light tubes are widely applied in various lighting application, such as advertisement lighting boards. In the above applications, ballasts are arranged in the lighting device to drive and ignite the fluorescent lamp tubes and LED light tubes.

In addition, the use of the electrical ballast may prolong the lamp life, maintain the illuminance stable during power variation and eliminate the flicker phenomenon occurred in the fluorescent lamp.

SUMMARY

One aspect of the present disclosure is an electrical ballast. The electrical ballast includes an inverter circuit, and a detection circuit. The inverter circuit is configured to receive a dc voltage and provide an output voltage to a lighting module. The detection circuit is electrically coupled to the inverter circuit and a voltage source, and configured to detect an ac voltage signal in the inverter circuit, and pull down the voltage source from a supply level to an under voltage locking level to shut down the inverter circuit on the condition that the ac voltage signal is greater than a threshold value, and restart the inverter circuit after a delay period.

Another aspect of the present disclosure is an electrical ballast driving method. The electrical ballast driving method includes converting, by an inverter circuit, a dc voltage to an output voltage to a lighting module; detecting, by an detection circuit, an ac voltage signal on the inverter circuit; pulling down, by the detection circuit, a voltage source from a supply level to an under voltage locking level to shut down the inverter circuit on the condition that the ac voltage signal is greater than a threshold value; and restarting, by the detection circuit, the inverter circuit being shutting down after a delay period.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
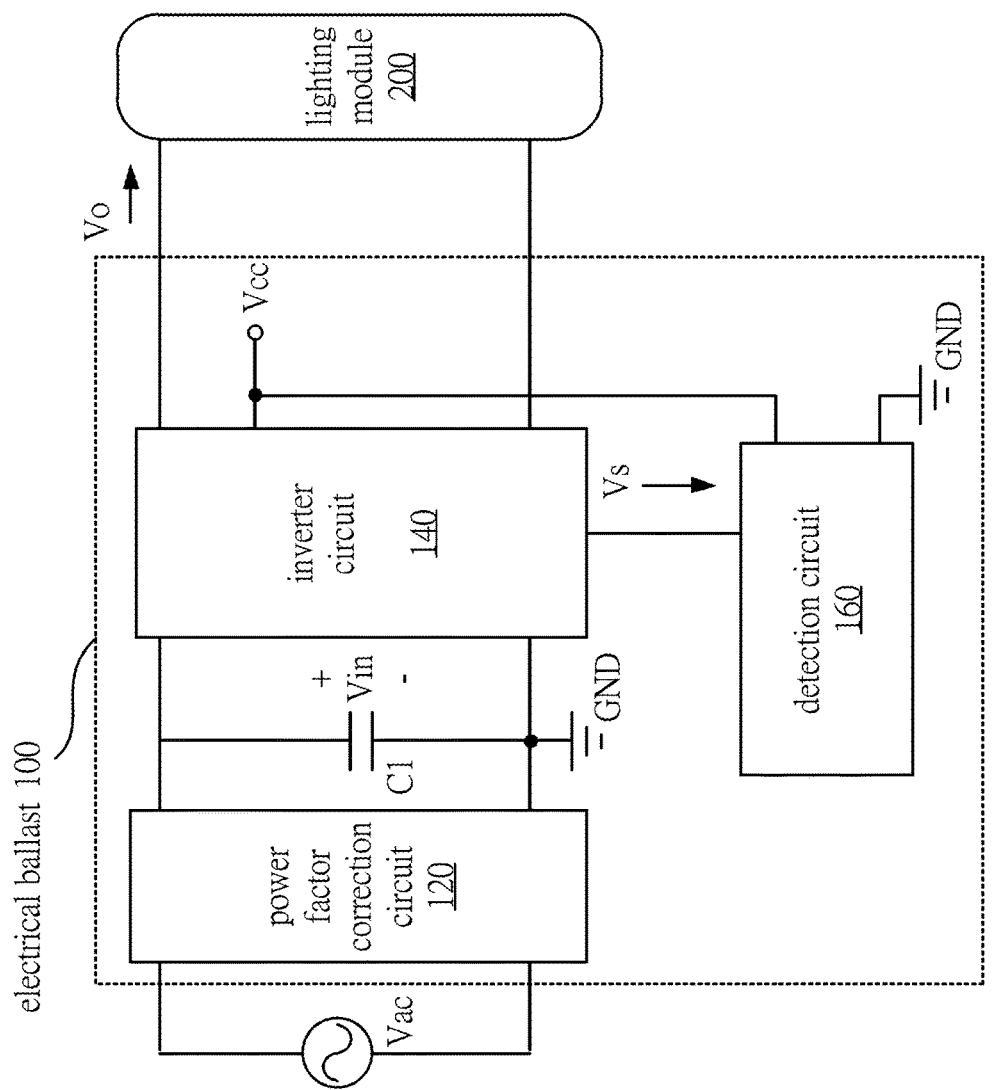
FIG. 1 is a diagram illustrating an electrical ballast 100 according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Reference is made to FIG. 1. FIG. 1 is a diagram illustrating an electrical ballast 100 according to some embodiments of the present disclosure. As shown in FIG. 1, in some embodiments, the electrical ballast 100 includes a power factor correction circuit 120, an inverter circuit 140, a detection circuit 160 and a capacitor C1. An input terminal of the electrical ballast 100 is electrically coupled to a grid and configured to receive an ac input voltage Vac from the grid. An output terminal of the electrical ballast 100 is electrically coupled to a lighting module 200 and configured to provide an output voltage Vo to drive the lighting module 200 illuminates.

In some embodiments, the output voltage Vo may be a high frequency ac output voltage, such as a high frequency ac voltage with the frequency of 20 kHz-100 kHz. Thus, the lighting circuit in the lighting module 200 may pre-heat and ignite a light tube in response to the output voltage Vo. Specifically, in some embodiments, the lighting module 200 may include one or more fluorescent lamps/tubes, but the present disclosure is not limited thereto. For example, in some other embodiments, the lighting module 200 may also include one or more light-emitting diode (LED) lamps/tubes, and configured to be lighted up by the electrical ballast 100 outputting corresponding output voltage Vo.

For the convenience of explanation, one inverter circuit 140 is depicted in FIG. 1. One skilled in the art can understand that the electrical ballast 100 may apply a circuit structure having two or more inverter circuits coupled in parallel, and the lighting module may also include multiple lighting tube coupled in parallel or in series, and thus the embodiments shown in FIG. 1 is merely an possible example of the present disclosure and not meant to limit the present disclosure.

The power factor correction circuit 120 is electrically coupled to a capacitor C1 and the inverter circuit 140. The power factor correction circuit 120 is configured to receive the ac input voltage Vac and provide the dc voltage Vin across two terminals of the capacitor C1 to the inverter circuit 140.

The inverter circuit 140 is electrically coupled to the lighting module 200 and configured to receive the dc voltage Vin across the two terminals of the capacitor C1, and convert the dc voltage Vin to the output voltage Vo, to provide the output voltage Vo to the lighting module 200.

The detection circuit 160 is electrically coupled to the inverter circuit 140, a voltage source Vcc and a ground terminal GND. Under a normal working state, the voltage source Vcc is configured to provide a supply level required by the operation of the inverter circuit 140 in the electrical ballast 100. The detection circuit 160 is configured to detect an ac voltage signal Vs in the inverter circuit 140, and pull down the voltage source Vcc from the supply level to an under voltage locking level to shut down operations of the inverter circuit 140 in the electrical ballast 100 on the condition that the ac voltage signal Vs is greater than a threshold value, and, after a delay period, pull up the voltage source Vcc again back to the supply level in order to restart the inverter circuit 140 in the electrical ballast 100.

Specifically, if a malfunction occurs in the lighting module 200 causing the light tube unable to be started normally, the circuit opens. At the time, an open circuit voltage (OCV) may be detected in the inverter circuit 140. The detection circuit 160 may control the electrical ballast 100 enter an auto-restrike mode according to the open circuit voltage. During this mode, the detection circuit 160 conducts the voltage source and the ground terminal GND in order to pull down the voltage source Vcc of the inverter circuit 140 to the under voltage locking level. Thus, the inverter circuit 140 will enter the under voltage protection mode and shut down correspondingly after losing the operating power, and stop outputting power.

After a delay period, the detection circuit 160 disconnects the voltage source Vcc and the ground terminal GND to again pull up the voltage source Vcc of the inverter circuit 140 back to the supply level and restart the inverter circuit 140 to try re-striking the light tube, and determine whether the light tube is ignited successfully according to the appearance or disappearance of the OCV.

Accordingly, by repeating the operations stated above, on the condition that the detection circuit 160 detects the ac voltage signal Vs is lower than the threshold voltage value (i.e., OCV disappeared), the electrical ballast 100 may leave the auto-restrike mode and back to the normal operation.

Therefore, the electrical ballast 100 may restrike the lighting module 200 automatically. After the malfunction of the lighting module 200 at the load side is cleared with replacing a new light tube, the electrical ballast 100 may automatically start the lighting module 200.

Figure 2:
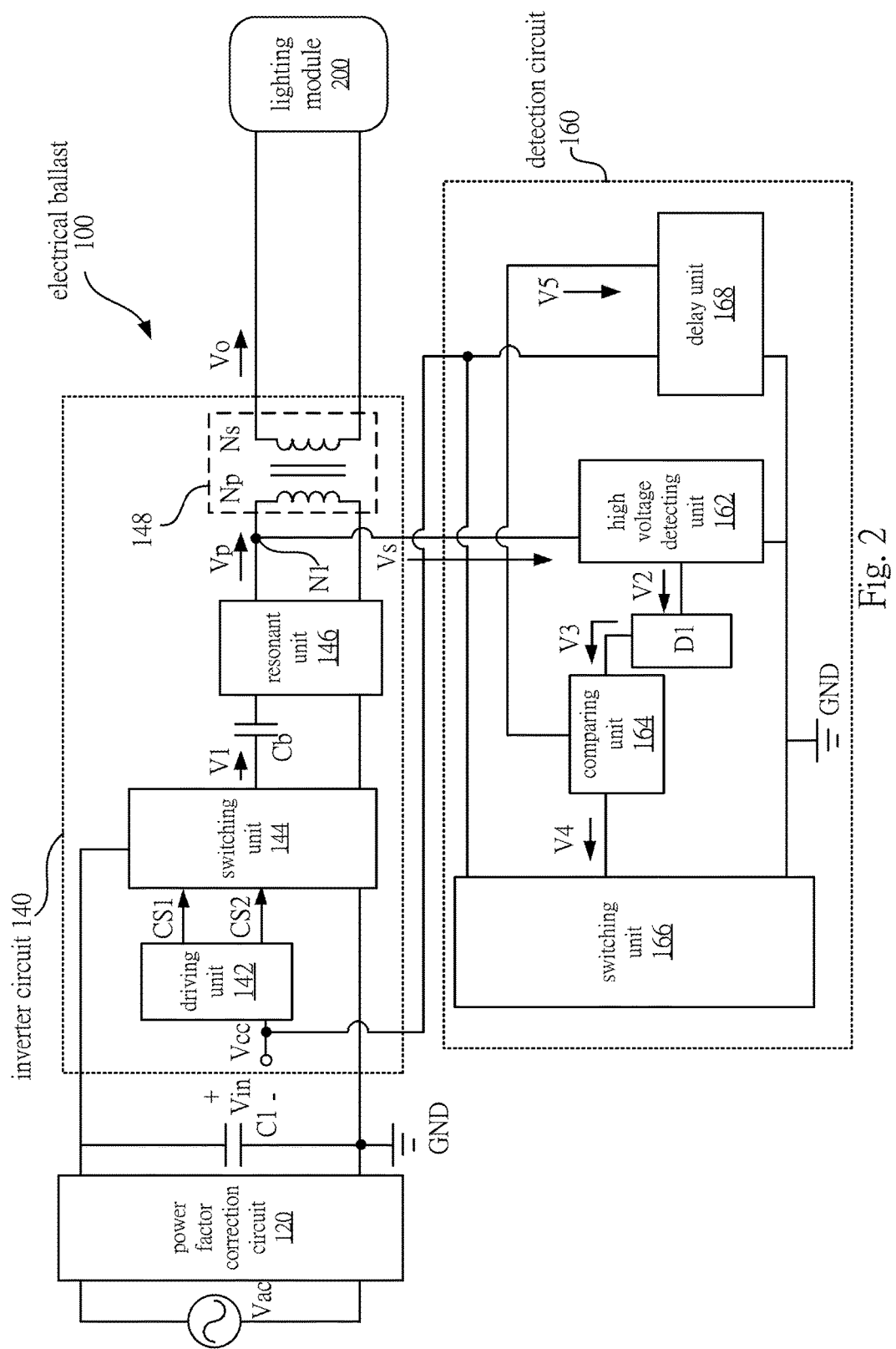
FIG. 2 is a diagram illustrating the electrical ballast according to some embodiments of the present disclosure.

For the convenience of explanation, the functional circuits and detailed operations of the inverter circuit 140 and the detection circuit 160 in the electrical ballast 100 will be explained in accompanied with the drawings in following paragraphs. Reference is made to FIG. 2. FIG. 2 is a diagram illustrating the electrical ballast 100 according to some embodiments of the present disclosure.

As shown in FIG. 2, in some embodiments, the inverter circuit 140 includes a driving unit 142, a switching unit 144, a resonant unit 146 and a transformer 148.

The driving unit 142 is electrically coupled to the switching unit 144 and configured to output driving signals CS1 and CS2 to the switching unit 144. For example, the driving unit 142 may be achieved by various driving chips, and the driving signals CS1 and CS2 may be Pulse Frequency Modulation (PFM) signals.

Input terminals of the switching unit 144 is configured to receive the dc voltage Vin and convert the dc voltage Vin to a switching signal V1 according to the driving signals CS1, CS2. Specifically, the switching signal V1 may be a high frequency square wave signal.

The resonant unit 146 is electrically coupled between the switching unit 144 and a primary winding Np of the transformer 148, and configured to receive the switching signal V1 to provide a primary signal Vp to the primary winding Np. Thus, the primary winding Np of the transformer 148 may receive the primary signal Vp having a sinusoidal wave such that a secondary winding Ns of the transformer 148 output a high frequency ac output voltage Vo, in response to the primary signal Vp, to the lighting module 200.

As shown in FIG. 2, in some embodiments, the detection circuit 160 is electrically coupled to the primary winding Np of the transformer 148 at a node N1, and configured to detect the primary signal Vp of the primary winding Np as the ac voltage signal Vs, but the present disclosure is not limited thereto.

Specifically, in some embodiments, the detection circuit 160 includes a high voltage detecting unit 162, a rectifying and filtering unit D1, a comparing unit 164, a switching unit 166 and a delay unit 168. The high voltage detecting unit 162 is electrically coupled to the inverter circuit 140 at the node N1 to receive and divide the ac voltage signal Vs to output an ac detecting signal V2.

The rectifying and filtering unit D1 is electrically coupled to the high voltage detecting unit 162 and configured to rectify the ac detecting signal V2 to output a dc detecting signal V3 to the comparing unit 164.

The comparing unit 164 is electrically coupled to the rectifying and filtering unit D1 and the switching unit 166. The switching unit 166 is electrically coupled between the voltage source Vcc and the ground terminal GND. Thus, on the condition that the ac voltage signal Vs is greater than the threshold value, the divided and rectified dc detecting signal V3 will be greater than a target level. The comparing unit 164 will correspondingly conduct on the condition that the dc detecting signal V3 is greater than the target level, in order to provide an enable signal V4 to the switching unit 166 such that the switching unit 166 conducts the voltage source Vcc and the ground terminal GND, and pull down the voltage source Vcc from the supply level in normal operation to the under voltage locking level. Thus, the driving unit 142 is configured to stop outputting the driving signals CS1, CS2 when the voltage source Vcc is at the under voltage locking level, and the inverter circuit 140 correspondingly shutdown.

On the other hand, on the condition that the dc detecting signal V3 is lower than the target level, the ac voltage signal Vs is not greater than the threshold value. At the time, the comparing unit 164 interrupts, no electrical path is formed and no enable signal V4 is provided to the switching unit 166. At the time, the switching unit 166 is also off, and the voltage source Vcc may be kept at the supply voltage to maintain the normal operation of the driving unit 142. For example, in some embodiments, the supply level of the voltage source Vcc is about 15V, and the value of the under voltage locking level is smaller than or equal to about 1V.

In addition, the delay unit 168 is electrically coupled to the comparing unit 164 and electrically coupled between the voltage source Vcc and the ground terminal GND. On the condition that the switching unit 166 conducts the voltage source Vcc and the ground terminal GND such that the voltage source Vcc is pulled down to the under voltage locking level, the delay unit 168 is configured to receive a delay signal V5 from the comparing unit 164. Thus, the delay unit 168 may keep conducting during the delay period, and be interrupted after the delay period in order to recover the voltage source Vcc of the inverter circuit 140 from the under voltage locking level to the supply level such that the inverter circuit 140 is restarted.

Alternatively stated, since the delay unit 168 is configured to keep conducting during the delay period, the voltage source Vcc may be kept at the under voltage locking level. On the other hand, after the delay period, the switching unit 166 and the delay unit 168 are both interrupted the circuit between the voltage source Vcc and the ground terminal GND after the delay period, and thus the voltage source Vcc may be recovered to the supply level to restart the inverter circuit 140.

Figure 3:
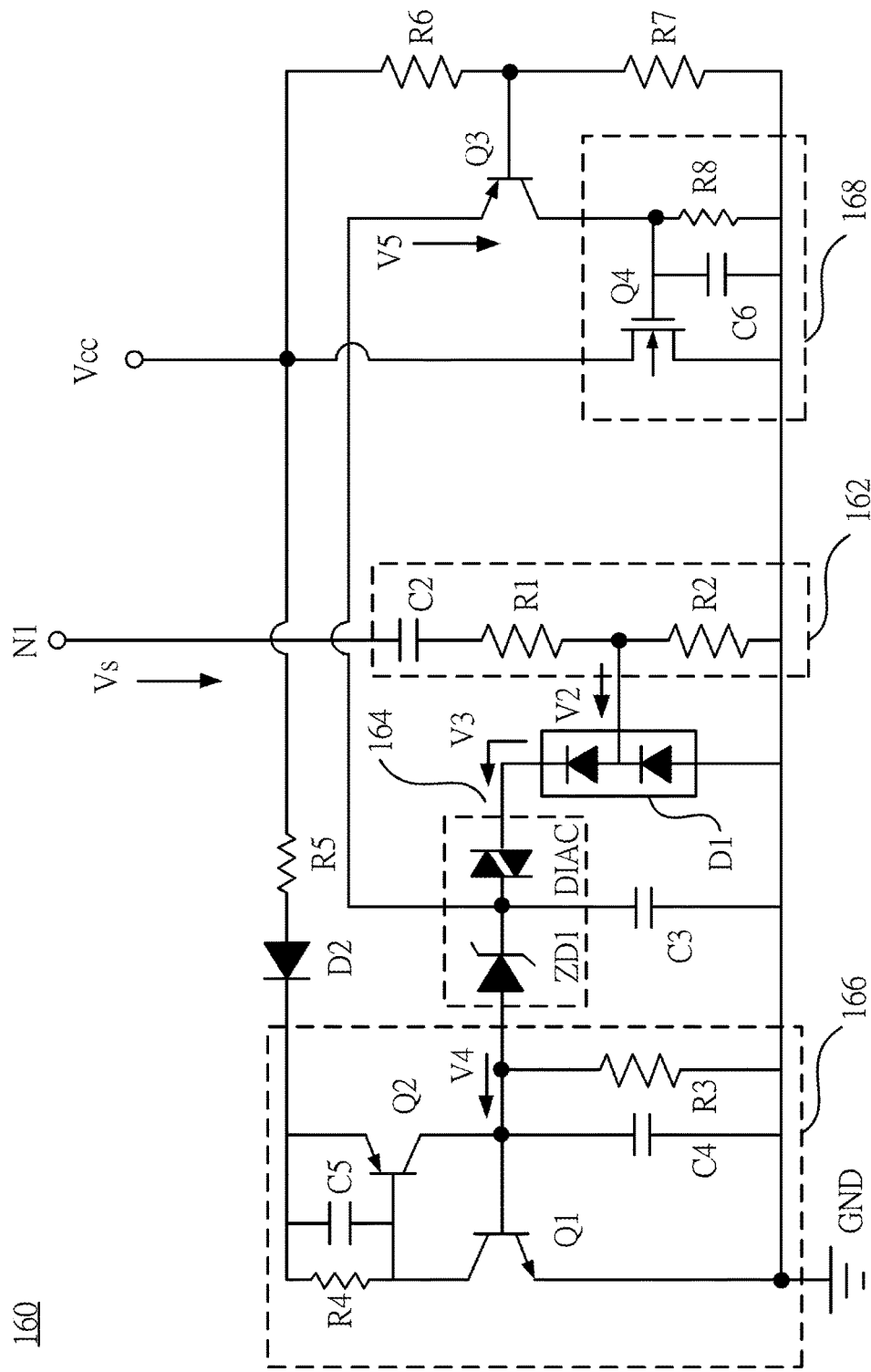
FIG. 3 is a diagram illustrating a detailed circuit of the detection circuit according to some embodiments of the present disclosure.

Reference is made to FIG. 3 together. FIG. 3 is a diagram illustrating a detailed circuit of the detection circuit 160 according to some embodiments of the present disclosure. With respect to the embodiments of FIGS. 1 and 2, like elements in FIG. 3 are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 3.

As shown in FIG. 3, in some embodiments, the high voltage detecting unit 162 includes a capacitor C2, resistors R1, R2. The capacitor C2, the resistors R1 and R2 are coupled in series to each other. Thus, the ac voltage signal Vs received from the node N1 may be divided by the resistors R1 and R2, and the high voltage ac voltage signal Vs may be lowered to the low voltage ac detecting signal V2 and then outputted to the rectifying and filtering unit D1. In some embodiments, the capacitor C2 is a DC blocking capacitor which may be configured to filter out the dc bias in the ac voltage signal Vs.

In some embodiments, the rectifying and filtering unit D1 may include a rectifying diode and a RC filtering circuit (not shown). Thus, the rectifying and filtering unit D1 may rectify the ac detecting signal V2 to the dc voltage with the rectifying diode, and further perform filtering to obtain a stable dc detecting signal V3 to output to the comparing unit 164 by the RC filtering circuit.

As shown in FIG. 3, in some embodiments, the comparing unit 164 includes a Zener Diode ZD1 and a Diode for Alternating Current (DIAC) DIAC. One terminal of the Diode for Alternating Current DIAC is electrically coupled to the rectifying and filtering unit D1 and configured to receive the dc detecting signal V3. Another terminal of the Diode for Alternating Current DIAC is electrically coupled to the cathode of the Zener Diode ZD1. The anode of the Zener Diode ZD1 is electrically coupled to the control terminal of the switching unit 166.

In some embodiments, the switching unit includes resistors R3 and R4, capacitors C4 and C5, and transistor switches Q1 and Q2. The resistors R3 and the capacitor C4 are electrically coupled in parallel to each other between a control terminal of the transistor switch Q1 and the ground terminal GND. The resistor R4 and the capacitor C5 are electrically coupled to each other at a first terminal of the transistor switch Q2 and a control terminal of the transistor switch Q2. A first terminal of the transistor switch Q1 is electrically coupled to the control terminal of the transistor switch Q2. A second terminal of the transistor switch Q1 is electrically coupled to the ground GND. The control terminal of the transistor switch Q1 is electrically coupled to the anode of the Zener Diode ZD1 and the second terminal of the transistor switch Q2.

On the condition that the dc detecting signal V3 being greater than the turn on voltage (e.g., about 32V) of the Diode for Alternating Current DIAC, the dc detecting voltage V3 charges the capacitor C3. On the condition that the voltage across the capacitor C3 exceeds the breakdown voltage (e.g., about 12V) of the Zener Diode ZD1, the Zener Diode conducts correspondingly, such that the transistor switch Q1 in the switching unit 166 receives the enable signal V4 and is turned on accordingly. Then, the transistor switch Q2 is turned on correspondingly such that the voltage source Vcc discharges via the resistor R5, the diode D2 and the resistor R3 and thus the voltage level of the voltage source Vcc is pull down to the under voltage locking level. At the time, the inverter circuit 140 stops operating and shutdowns correspondingly.

On the other hand, in some embodiments, the resistors R6 and R7 in the detecting circuit 160 are coupled in series to each other between the voltage source Vcc and the ground terminal GND. A first terminal of the transistor switch Q3 is electrically coupled to a first terminal of the capacitor C3, a control terminal of the transistor switch Q3 is electrically coupled to the voltage division node between the resistors R6 and R7, and a second terminal of the transistor switch Q3 is electrically coupled to the delay unit 168.

Thus, on the condition that the voltage level of the voltage source Vcc is pulled down to the under voltage locking level, the divided voltage received by the control terminal of the transistor switch Q3 is also pulled down to turn on the transistor switch Q3 correspondingly. At the time, the delay unit 168 may be configured to receive the delaying signal V5 (i.e., the voltage across the capacitor C3) from the comparing unit 164.

As shown in FIG. 3, in some embodiments, the delay unit 168 includes a transistor switch Q4, an energy-storing capacitor C6 and a discharging resistor R8. The transistor switch Q4 is electrically coupled between the voltage source Vcc and the ground terminal GND. Specifically, a first terminal of the transistor switch Q4 is electrically coupled to the voltage source Vcc, and a second terminal of the transistor switch Q4 is electrically coupled to the ground terminal GND, and a control terminal of the transistor switch Q4 is electrically coupled to the second terminal of the transistor switch Q3.

A first terminal of the energy-storing capacitor C6 is electrically coupled to the control terminal of the transistor switch Q4, a second terminal of the energy-storing capacitor C6 is electrically coupled to the ground terminal GND. The discharging resistor R8 is electrically coupled to the energy-storing capacitor C6 in parallel.

Thus, on the condition that the voltage source Vcc is pulled down to the under voltage locking level, the energy-storing capacitor C6 may be configured to charge according to the delay signal V5. Therefore, as the voltage level of the control terminal of the transistor switch Q4 rises, the transistor switch Q4 is turned on correspondingly such that the delay unit 168 keeps conducting during the delay period and keeps the voltage source Vcc at the under voltage locking level, such that the inverter circuit 140 maintains shutdown.

In addition, the energy-storing capacitor C6 and the discharging resistor R8 form a discharging circuit. Accordingly, the discharging resistor R8 may provide a discharge path for the energy-storing capacitor C6 to discharge. As the energy stored in the capacitor C3 and the energy-storing capacitor C6 consumed by the discharging resistor R8, the comparing unit 164 and the delay unit 168 are disable successively.

Specifically, as the discharging resistor R8 continuously discharges, the voltage across the capacitor C3 gradually decreases, and the Zener Diode ZD1 in the comparing unit 164 cutoffs and stop outputting the enable signal V4 such that the switching unit 166 turns off correspondingly. Similarly, the voltage across the energy-storing capacitor C6 also gradually decreases. After the configured delay period (e.g., about 6 seconds), the voltage level of the control terminal of the transistor switch Q4 is lower than the turn on voltage of the transistor switch Q4 and thus the transistor switch Q4 is turned off after the delay period, to recover the voltage source Vcc from the under voltage locking level back to the supply level and restart the inverter circuit 140.

Accordingly, as shown in FIG. 3, by the cooperation of the above-stated electronic devices, the circuit units in the electrical ballast may be implemented. It is noted that, the embodiments shown in FIG. 3 is merely by example and simplified for the convenience of explaining the operations between the elements, and not meant to limit the present disclosure.

Figure 4:
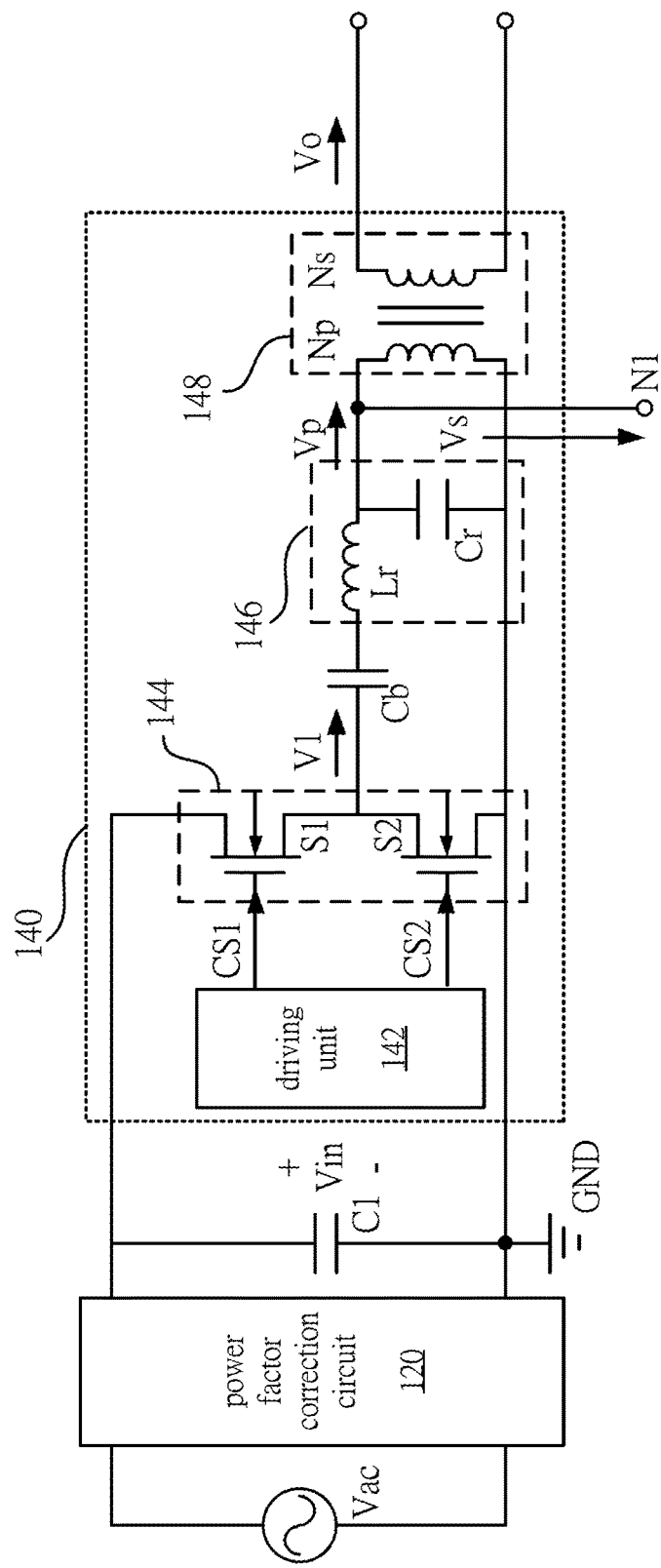
FIG. 4 is a diagram illustrating a detailed circuit of the inverter circuit according to some embodiments of the present disclosure.

Reference is made to FIG. 4. FIG. 4 is a diagram illustrating a detailed circuit of the inverter circuit 140 according to some embodiments of the present disclosure. With respect to the embodiments of FIGS. 1 and 2, like elements in FIG. 4 are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 4.

As shown in FIG. 4, the switching unit 144 may be realized by a half-bridge switching circuit. For example, in some embodiments, the switching unit 144 includes a plurality of switches S1, S2. A first terminal of the switch S1 is electrically coupled to a first terminal of the capacitor C1, and a second terminal of the switch S1 is electrically coupled to a first terminal of the switch S2, a second terminal of the switch S2 is electrically coupled to the first terminal of the capacitor C1.

Control terminals of the switches S1 and S2 are respectively configured to receive driving signals CS1, CS2 outputted by the driving unit 142, in which the driving signals CS1, CS2 respectively provide an enable signal in the first half period and the second half period of a complete cycle. Thus, the switches S1 and S2 may be respectively turned on in the first half period and the second half period, such that the switching unit 144 outputs the high frequency square wave as the switching signal V1 at the output terminal. Alternatively stated, the switching unit 144 may be configured to switch on or off of the switches S1 and S2 according to the switching frequency to convert the dc voltage Vin to the switching signal V1.

In the embodiments shown in FIG. 4, the dc blocking capacitor Cb is electrically coupled between the output terminal of the switching unit 144 and the input terminal of the resonant unit 146. The input terminal of the resonant unit 146 is configured to receive the switching signal V1 with the dc bias being filtered by the dc blocking capacitor Cb. The output terminal of the resonant unit 146 is electrically coupled to the primary winding Np of the transformer 148. In some embodiments, the resonant unit 146 includes a resonant capacitor Cr and a resonant inductor Lr. As shown in FIG. 4, in some embodiments, the resonant inductor Lr is electrically coupled between the dc blocking capacitor Cb and the primary winding Np of the transformer 148, and the resonant capacitor Cr is coupled across two terminals of the primary winding Np. Thus, the switching unit 144, the resonant unit 146, and the transformer 148 may form a structure of a half-bridge series resonant converter, such that the secondary winding Ns of the transformer 148 provides the output voltage Vo to the lighting module in response to the primary signal Vp. It is noted that, the embodiments shown in FIG. 4 are merely by example and simplified for the convenience of explaining the operation between elements and not meant to limit the present disclosure.

For example, in some other embodiments, the switching unit 144 may also be achieved by a full bridge switching circuit in accordance with actual needs, and the resonant unit 146 may also be achieved by one or more inductance units and capacitance units to realize a LC resonant circuit, a LCC resonant circuit, a LLCC resonant circuit, and thus the resonant unit 146 is merely one possible example of the present disclosure and not meant to limit the present disclosure. Alternatively stated, one skilled in the art can understand that the resonant unit 146 in various embodiments of the present disclosure may be any combinations of one or more inductance units and one or more capacitance units electrically coupled in various ways, such as in series or in parallel, to achieve resonant.

Figure 5:
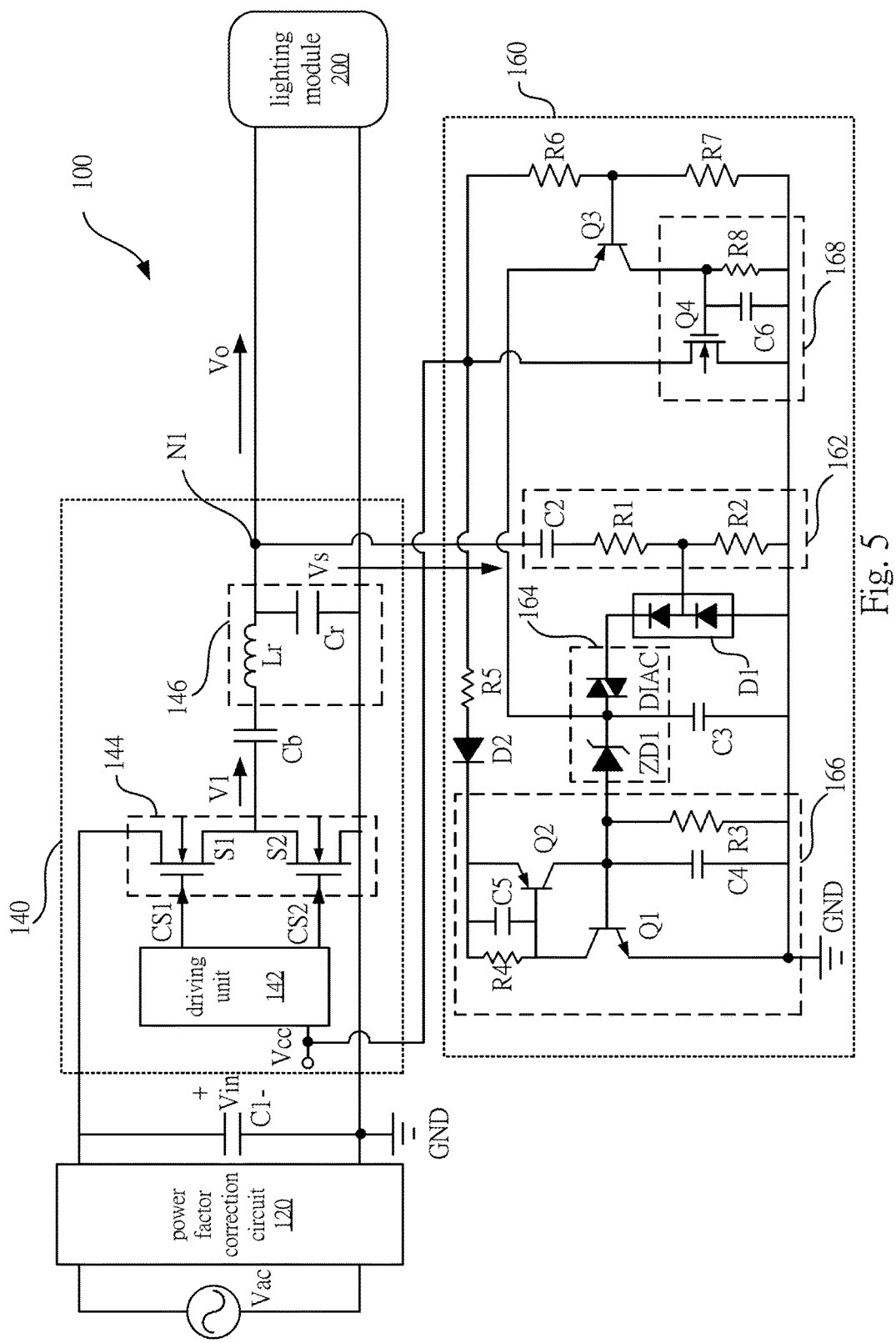
FIG. 5 is a diagram illustrating the electrical ballast according to some other embodiments of the present disclosure.

In addition, the inverter circuit 140 may also be realized by other circuit structure and not limited to the isolated converting circuit structure shown in FIG. 4. Reference is made to FIG. 5. FIG. 5 is a diagram illustrating the electrical ballast 100 according to some other embodiments of the present disclosure. With respect to the embodiments of FIGS. 1-4, like elements in FIG. 5 are designated with the same reference numbers for ease of understanding.

Compared to the embodiments shown in FIG. 2, in the embodiments shown in FIG. 5, the resonant unit 146 is electrically coupled between the switching unit 144 and the lighting module 200 via the dc blocking capacitor Cb and configured to receive the switching signal V1 to provide the output voltage Vo to the lighting module 200. Alternatively stated, in some embodiments, the inverter circuit 140 may also apply a non-isolated converting circuit structure and provide the output voltage Vo to the lighting module 200 by the resonant unit 146 without isolated conversion of the transformer. In the present embodiments, the detection circuit 160 is electrically coupled to the resonant unit 146 at the node N1 and configured to detect the output voltage Vo as the ac voltage signal Vs.

In the present embodiments, the detection circuit 160 is also configured to detect the ac voltage signal Vs and pull down the voltage source Vcc from the supply level to the under voltage locking level to shut down the inverter circuit 140 on the condition that the ac voltage signal Vs is greater than the threshold value, and recover the voltage source Vcc from the under voltage locking level to the supply level after the delay period, in order to restart the inverter circuit 140. The detailed operations are similar as discussed in the above embodiments and thus are omitted herein for the sake of brevity.

Figure 6:
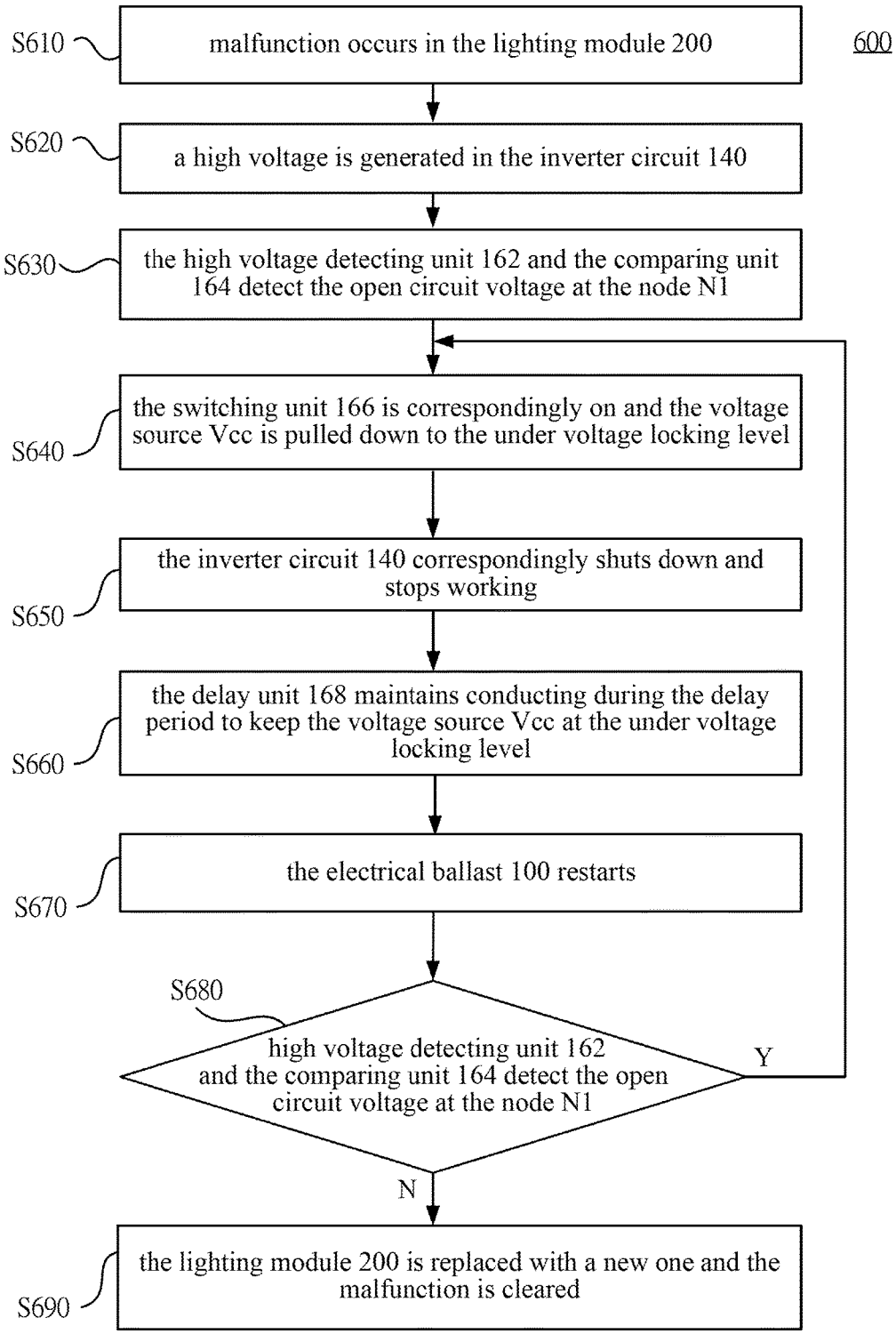
FIG. 6 is a flowchart illustrating an operating process of the electrical ballast in accompanied with the lighting module, in accordance with some embodiments of the present disclosure.

Reference is made to FIG. 6. FIG. 6 is a flowchart illustrating an operating process 600 of the electrical ballast 100 in accompanied with the lighting module 200, in accordance with some embodiments of the present disclosure. As shown in FIG. 6, the operating process 600 includes operations S610, S620, S630, S640, S650, S660, S670, S680 and S690. First of all, as shown in the operation S610, a malfunction occurs in the light tube or filament and the light tube or filament is unable to be ignited. When the malfunction occurs, as shown in the operation S620, a high voltage is generated in the inverter circuit 140. Next, as shown in the operation S630, the high voltage detecting unit 162 and the comparing unit 164 are configured to detect the open circuit voltage at the node N1. As shown in the operation S640, as the open circuit voltage being detected at the node N1, the switching unit 166 is correspondingly on and the voltage source Vcc is pulled down to the under voltage locking level. As shown in the operation S650, the inverter circuit 140 correspondingly shuts down and stops working.

As shown in the operation S660, after the switching unit 166 is on, the delay unit 168 maintains conducting during the delay period to keep the voltage source Vcc at the under voltage locking level. As shown in the operation S670, after the delay, the electrical ballast 100 restarts. After the delay period, the voltage source Vcc is once again recovered to the operating voltage level to restart the electrical ballast 100. As shown in the operation S680, if the high voltage detecting unit 162 and the comparing unit 164 detect the OCV at the node N1, which means the malfunction is not cleared after the delay period and the OCV still exists, the inverter circuit 140 is not restarted successfully. Under such circumstance, the operation S640 will be performed automatically and the operations S640-S680 will be repeatedly executed to try to restart the inverter circuit 140 periodically until the malfunction is cleared. On the other hand, as shown in the operation S690, if the high voltage detecting unit 162 and the comparing unit 164 does not detect the OCV at the node N1, which means the lighting module 200 is replaced with a new one and the malfunction is cleared after the delay period. At the time, the OCV disappears correspondingly and the detection circuit 160 does not pull down the voltage source Vcc. Under such circumstance, the inverter circuit 140 may be successfully restarted when the voltage source Vcc is recovered to the operating voltage level, and back to a normal operating state.

Figure 7:
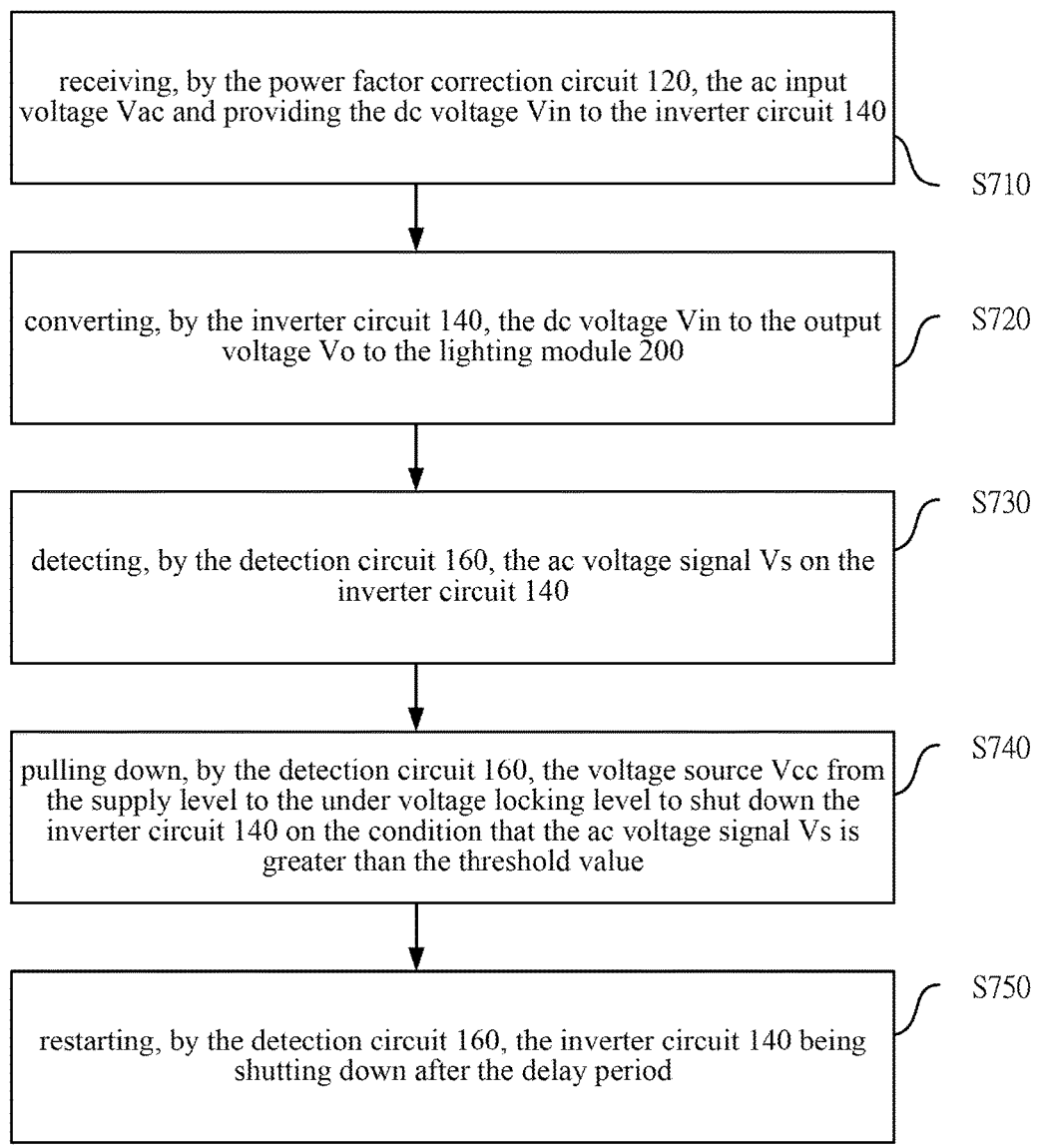
FIG. 7 is a flowchart of a driving method illustrating operations of the electrical ballast, in accordance with some embodiments of the present disclosure.

Reference is made to FIG. 7. FIG. 7 is a flowchart of a driving method 700 illustrating operations of the electrical ballast 100, in accordance with some embodiments of the present disclosure. For better understanding of the present disclosure, the driving method 700 is discussed in relation to the embodiments shown in FIG. 1-FIG. 5, but is not limited thereto. It will be apparent to those skilled in the art that various modifications and variations can be made to the structure of the present disclosure without departing from the scope or spirit of the disclosure. As shown in FIG. 7, the driving method 700 includes steps S710, S720, S730, S740, and S750.

First, in the step S710, the electrical ballast 100 receives, by the power factor correction circuit 120, the ac input voltage Vac and provide the dc voltage Vin to the inverter circuit 140.

In the step S720, the electrical ballast 100 converts, by the inverter circuit 140, the dc voltage Vin to the output voltage Vo to the lighting module 200.

In the step S730, the electrical ballast 100 detects, by the detection circuit 160, the ac voltage signal Vs on the inverter circuit 140.

In the step S740, the electrical ballast 100 pulls down, by the detection circuit 160, the voltage source Vcc from the supply level to the under voltage locking level to shut down the inverter circuit 140 on the condition that the ac voltage signal Vs is greater than the threshold value.

In the step S750, the electrical ballast 100 restarts, by the detection circuit 160, the inverter circuit 140 being shutting down after the delay period.

Those skilled in the art can immediately understand how to perform the operations and functions of the driving method 700 based on the electrical ballast 100 in the embodiments described above, and thus a further explanation is omitted herein for the sake of brevity.

In summary, in various embodiments of the present disclosure, by detecting the ac signal of the OCV generated in the inverter circuit during the light tube malfunction occurs, the electrical ballast may be controlled to repeat auto restrike automatically without performing the filament detection with the dc voltage.

For example, in the auto restrike mode, after the activation failed, the electrical ballast may re-enter the low voltage pre-heat period (e.g., about 1 second) and the high voltage ignition period (e.g., about 1 second) after the delay period (e.g., about 6 seconds) to try reactivation. Thus, while the light tube is replaced with a new one clearing the malfunction, the electrical ballast may ignite the light tube. As the OCV ac signal disappeared correspondingly after the ignition of the light tube, the electrical ballast may leave the auto restrike mode and enter the normal operating mode.

While disclosed methods are illustrated and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

It is noted that, the drawings, the embodiments, and the features and circuits in the various embodiments may be combined with each other as long as no contradiction appears. The circuits illustrated in the drawings are merely examples and simplified for the simplicity and the ease of understanding, but not meant to limit the present disclosure.

In addition, one skilled in the art can understand that in the various embodiments, the circuit units may be implemented by various digital or analog circuits, and may be implemented by different integrated chips. Elements may also be integrated in a signal integrated chip. The above embodiments are merely by example and not to limit the present disclosure. The electronic devices such as resistors, capacitors, inductors, diodes, transistor switches may be implemented by proper power electronic components. For example, the transistor switches Q1-Q4 may be realized by Metal-Oxide-Semiconductor Field-Effect Transistors (MOSFETs), Bipolar Junction Transistors (BJTs) or other types of transistors according to actual needs.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electrical ballast, comprising:
   an inverter circuit configured to receive a dc voltage and provide an output voltage to a lighting module; and
   a detection circuit electrically coupled to the inverter circuit and a voltage source, and configured to detect an ac voltage signal in the inverter circuit, and pull down the voltage source from a supply level to an under voltage locking level to shut down the inverter circuit on the condition that the ac voltage signal is greater than a threshold value, and restart the inverter circuit after a delay period;
   wherein the detection circuit comprises a delay unit electrically coupled between the voltage source and a ground terminal, wherein on the condition that the voltage source is pulled down to the under voltage locking level, the delay unit is configured to conduct during a delay period.

2. The electrical ballast of claim 1, wherein the inverter circuit comprises:
   a transformer, wherein a primary winding of the transformer is configured to receive a primary signal, and a secondary winding of the transformer is configured to output the output voltage in response to the primary signal; and
   wherein the detection circuit is electrically coupled to the primary winding of the transformer and configured to detect the primary signal on the primary winding as the ac voltage signal.

3. The electrical ballast of claim 2, wherein the inverter circuit further comprises:
   a switching unit comprising a plurality of switches, and configured such that the switches are turned on or off according to a switching frequency to convert the dc voltage to a switching signal; and
   a resonant unit electrically coupled between the switching unit and the primary winding, and configured to receive the switching signal to provide the primary signal to the primary winding.

4. The electrical ballast of claim 1, wherein the inverter circuit comprises:
   a switching unit comprising a plurality of switches, and configured such that the switches are turned on or off according to a switching frequency to convert the dc voltage to a switching signal;
   a resonant unit electrically coupled between the switching unit and the lighting module, and configured to receive the switching signal to provide the output voltage to the lighting module; and
   wherein the detection circuit is electrically coupled to the resonant unit and configured to detect the output voltage as the ac voltage signal.

5. The electrical ballast of claim 1, further comprising:
   a power factor correction circuit electrically coupled to the inverter circuit, and configured to receive an ac input voltage and provide the dc voltage to the inverter circuit.

6. The electrical ballast of claim 1, wherein the detection circuit comprises:
   a switching unit electrically coupled between the voltage source and a ground terminal; and
   a comparing unit electrically coupled to the switching unit, wherein on the condition that the ac voltage signal is greater than the threshold value, the comparing unit conducts to provide an enable signal to the switching unit such that the switching unit is on to pull down the voltage source to the under voltage locking level.

7. The electrical ballast of claim 6, wherein the detection circuit further comprises:
   a high voltage detecting unit configured to receive and divide the ac voltage signal to output an ac detecting signal;
   a rectifying and filtering unit electrically coupled to the high voltage detecting unit and configured to rectify the ac detecting signal to output a dc detecting signal; and
   wherein the comparing unit is configured to conduct on the condition that the dc detecting signal is greater than a target level.

8. The electrical ballast of claim 6, wherein the comparing unit comprises a zener diode and a diode for alternating current, and one terminal of the diode for alternating current is configured to receive a dc detecting signal, and another terminal of the diode for alternating current is electrically coupled to a cathode of the zener diode, and an anode of the Zener diode is electrically coupled to a control terminal of the switching unit.

9. The electrical ballast of claim 1, wherein the delay unit is configured to interrupt after the delay period, in order to recover the voltage source from the under voltage locking level to the supply level such that the inverter circuit is restarted.

10. The electrical ballast of claim 1, wherein the delay unit comprises:
    a transistor switch electrically coupled between the voltage source and the ground terminal;
    an energy-storing capacitor, wherein a first terminal of the energy-storing capacitor is electrically coupled to a control terminal of the transistor switch, a second terminal of the energy-storing capacitor is electrically coupled to the ground terminal, and on the condition that the voltage source is pulled down to the under voltage locking level, the energy-storing capacitor is configured to charge according to a delay signal; and
    a discharging resistor electrically coupled to the energy-storing capacitor in parallel and configured to provide a discharge path for the energy-storing capacitor to discharge such that the transistor switch is turned off after the delay period, in order to recover the voltage source from the under voltage locking level to the supply level such that the inverter circuit is restarted.

11. An electrical ballast driving method comprising:
    converting, by an inverter circuit, a dc voltage to an output voltage to a lighting module;
    detecting, by an detection circuit, an ac voltage signal on the inverter circuit;

pulling down, by the detection circuit, a voltage source from a supply level to an under voltage locking level to shut down the inverter circuit on the condition that the ac voltage signal is greater than a threshold value;

restarting, by the detection circuit, the inverter circuit being shutting down after a delay period; and configuring a delay unit in the detection circuit to conduct during a delay period on the condition that the voltage source is pulled down to the under voltage locking level, wherein the delay unit is electrically coupled between the voltage source and a ground terminal.

12. The electrical ballast driving method of claim 11, further comprising:

receiving a primary signal from a primary winding of a transformer in the inverter circuit;

outputting the output voltage via a secondary winding of the transformer in response to the primary signal; and detecting, by the detection circuit, the primary signal on the primary winding as the ac voltage signal.

13. The electrical ballast driving method of claim 12, further comprising:

switching, by a switching unit in the inverter circuit, a plurality of switches in the switching unit according to a switching frequency to convert the dc voltage to a switching signal; and receiving, by a resonant unit, the switching signal to provide the primary signal to the primary winding.

14. The electrical ballast driving method of claim 11, further comprising:

switching, by a switching unit in the inverter circuit, a plurality of switches in the switching unit according to a switching frequency to convert the dc voltage to a switching signal; and receiving, by a resonant unit, the switching signal to provide the output voltage to the lighting module; and detecting, by the detection circuit, the output voltage as the ac voltage signal.

15. The electrical ballast driving method of claim 11, further comprising:

receiving, by a power factor correction circuit, an ac input voltage and provide the dc voltage to the inverter circuit.

16. The electrical ballast driving method of claim 11, further comprising:

conducting a comparing unit in the detection circuit to provide an enable signal to a switching unit in the detection circuit on the condition that the ac voltage signal is greater than the threshold value, wherein the switching unit is electrically coupled between the voltage source and a ground terminal; and turning on the switching unit according to the enable signal, in order to pull down the voltage source to the under voltage locking level.

17. The electrical ballast driving method of claim 16, further comprising:

receiving and dividing the ac voltage signal, by a high voltage detecting unit in the detection circuit, to output an ac detecting signal;

rectifying, by a rectifying and filtering unit in the detection circuit, the ac detecting signal to output a dc detecting signal; and conducting, the comparing unit on the condition that the dc detecting signal is greater than a target level.

18. The electrical ballast driving method of claim 17, wherein conducting the comparing unit comprises:

conducting, a zener diode and a diode for alternating current in the comparing unit on the condition that the dc detecting signal is greater than the target level, wherein one terminal of the diode for alternating current is configured to receive the dc detecting signal, and another terminal of the diode for alternating current is electrically coupled to a cathode of the zener diode, and an anode of the Zener diode is electrically coupled to a control terminal of the switching unit.

19. The electrical ballast driving method of claim further comprising:

configuring the delay unit to be interrupted after the delay period, in order to recover the voltage source from the under voltage locking level to the supply level such that the inverter circuit is restarted.

20. The electrical ballast driving method of claim 11, further comprising:

charging an energy-storing capacitor in the delay unit according to a delay signal on the condition that the voltage source is pulled down to the under voltage locking level;

providing a discharge path, by a discharging resistor in the delay unit, for the energy-storing capacitor to discharge such that a transistor switch is turned off after the delay period, in order to recover the voltage source from the under voltage locking level to the supply level; and wherein a first terminal of the energy-storing capacitor is electrically coupled to a control terminal of the transistor switch, a second terminal of the energy-storing capacitor is electrically coupled to the ground terminal, the discharging resistor is electrically coupled to the energy-storing capacitor in parallel, and the transistor switch is electrically coupled between the voltage source and the ground terminal.

* * * * *